UNITED STATES PATENT OFFICE.

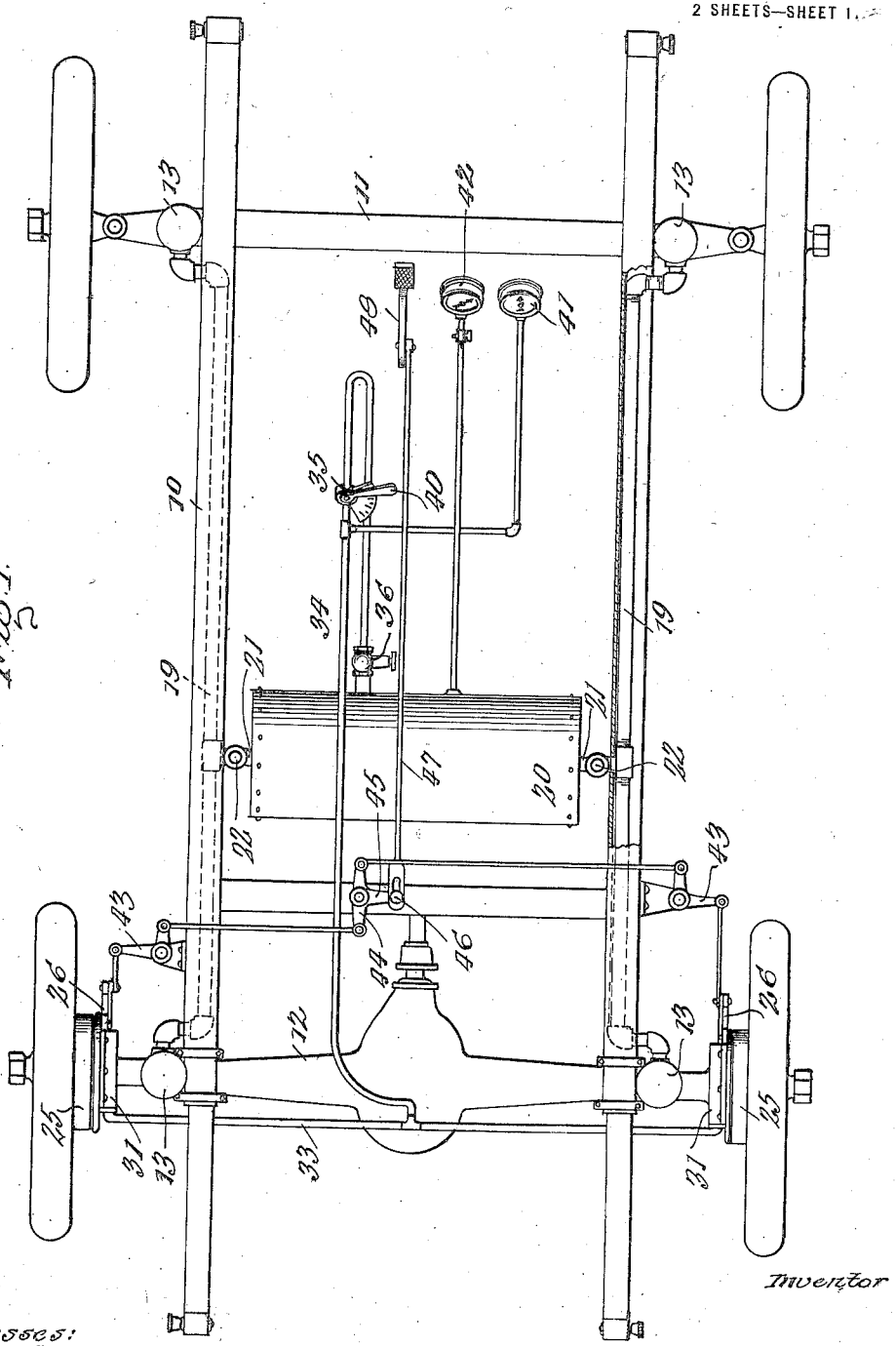

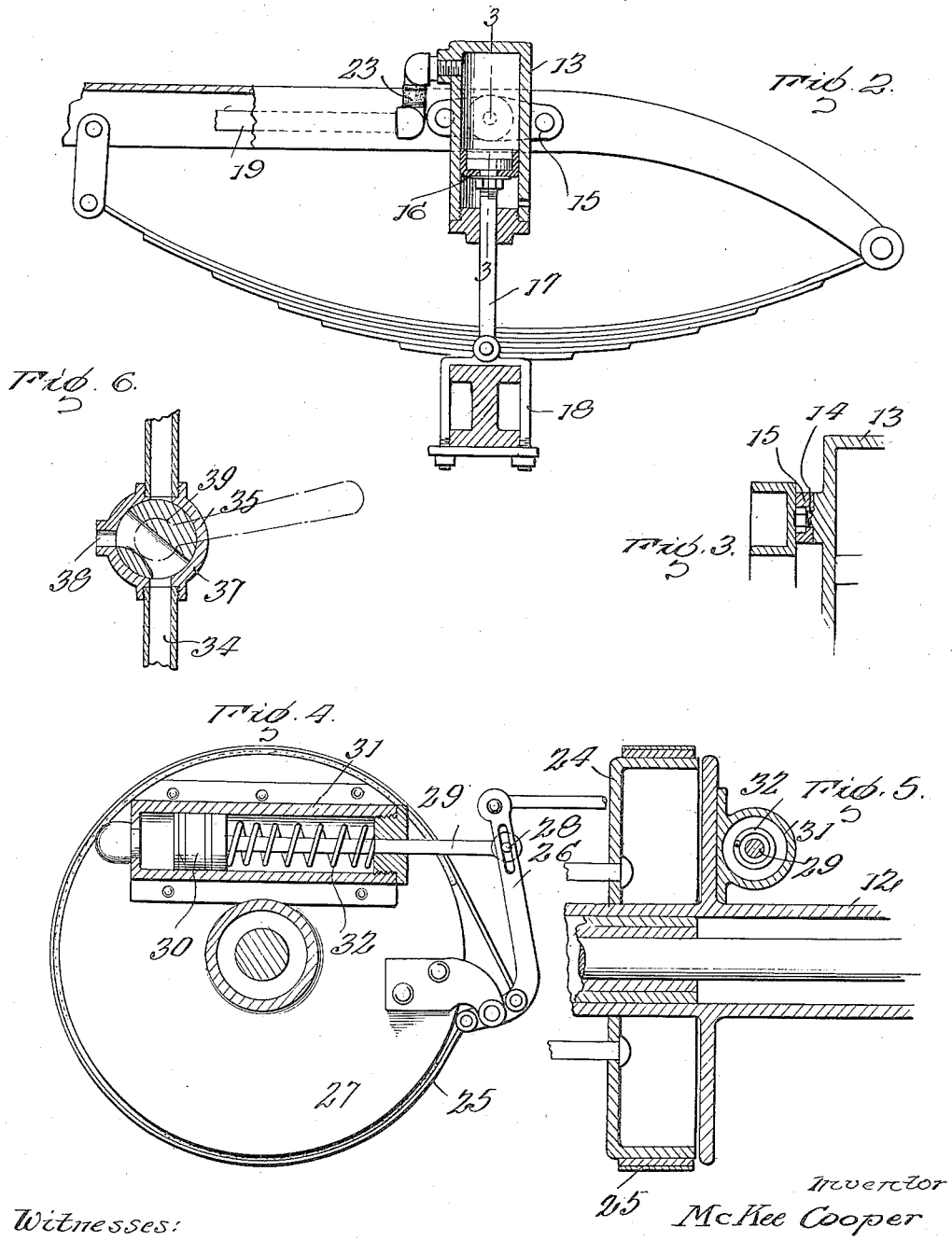

McKEE COOPER, OF ASHEVILLE, NORTH CAROLINA, ASSIGNOR OF ONE-HALF TO ROBERT R. REYNOLDS, OF NEW YORK, N. Y.

AIR-BRAKE.

1,332,428.   Specification of Letters Patent.   Patented Mar. 2, 1920.

Application filed March 1, 1919. Serial No. 280,082.

*To all whom it may concern:*

Be it known that I, McKEE COOPER, a citizen of the United States, residing at Asheville, in the county of Buncombe and State of North Carolina, have invented certain new and useful Improvements in Air-Brakes, of which the following is a specification.

This invention has relation primarily to air brakes, and has for an object to provide an air brake for a motor vehicle including an air reservoir, a valve and means operable by air pressure to arrest motion of the vehicle wheels.

Another object of the invention is to provide an air brake for motor vehicles including a braking mechanism of the band type and a brake cylinder and lever mechanism operable by air pressure to apply the band brake.

A still further object of the invention is to provide a shock absorber for motor vehicles including cylinders mounted on the vehicle frame and pistons therein connected to the supporting wheels whereby compression of the air in the cylinders due to movement of the frame relative to the wheels will cushion the road shocks and insure easier riding.

A still further object of the invention is to provide a combination of a shock absorber of the type above set forth and an air pressure operated brake mechanism whereby air pressure created by operation of the shock absorbers may be utilized to operate the brakes.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear, Figure 1 is a view in plan of a motor vehicle frame showing the arrangement therein of my invention.

Fig. 2 is a view in section of the combined shock absorber and air compressor.

Fig. 3 is a detail section taken on the line 3—3 of Fig. 2.

Fig. 4 is a view in section of the braking mechanism, and

Fig. 5 is a central vertical section of the immediate preceding figure.

Fig. 6 is a view in section of the three-way valve.

With reference to the drawings, 10 indicates the frame of a motor vehicle, 11 the front axle and 12 the rear axle housing. Mounted upon the side frame members are vertical cylinders 13, two above the front axle and two above the rear axle. In each instance the cylinder is mounted upon a bolt 14 which is secured to a casting 15 secured to the frame so as to permit oscillation of the cylinder. Each cylinder contains a piston 16 and piston rod 17, the latter having a pivotal connection with the axle by means of a clip 18 or the like. Each cylinder is formed with an opening at its upper end, and the openings of the cylinders at the same side of the frame are connected by means of a pipe or conduit 19. If the side frame members are of the channel type the pipes may conveniently be retained therein. A tank or reservoir 20 is mounted on the frame and is in communication with the pipes 19 by means of couplings 21, the latter having a check valve 22 therein in each instance.

From the foregoing it will be apparent that during travel of the vehicle the movement of the frame relative to the wheels will cause reciprocation of the cylinders relative to the pistons and therefore compress air in the upper ends of the cylinders, causing a rise of air pressure in the reservoir because of the check valves 22. Air is permitted to enter the cylinders upon upward movement thereof because of the loose washer type of piston employed, enabling the washer to hug the cylinder when compressing air and to space itself from the cylinder when drawing in air. A flexible connection 23 may be established between each cylinder and the pipe 19 to permit free movement of the cylinder.

Thus, all road shocks sustained by the vehicle will be effectually absorbed by the piston and cylinder arrangement since the rebound of the frame in a downward direction is retarded. This movement of the frame is utilized at the same time to store energy in the reservoir.

The braking mechanism is of the band type consisting of the brake drums 24 which are secured to the rear wheels. The brake 110 band 25 encompasses the drum and its ends are connected at opposite sides of the fulcrum of a lever 26, the latter being mounted upon a discous enlargement 27 of the rear axle housing 12. One end of the lever is slotted to receive a pin 28, extending from a piston rod 29, the latter carrying a piston 30 which operates in a horizontal brake cylinder 31. The brake cylinder is mounted on the enlargement 27 as shown. A coiled spring 32 surrounds the rod and is interposed between the piston and the head of the cylinder to retain the brake band in a disengaged position. The rear ends of the cylinder 31 are connected by means of a pipe or conduit 33, and said pipe is connected by means of a pipe 34 with the reservoir 20. A throttle or three way valve 35 as well as a reducing valve 36 are located in said pipe 34, the throttle valve being shown in detail in Fig. 6, from which it will be seen to consist of a casing 37 having opposed ports connected to the conduit 34, and having a vent port 38. A turn plug valve 39 rotates in the casing and is formed with a by-pass.

In operation, the brakes are applied by rotating the turn plug 39 by means of the handle 40 until the by-pass opens the conduit 34 to permit air from the reservoir 20, suitably lowered in pressure by operation of the reducing valve 36, to enter the rear ends of the brake cylinders 31, causing the pistons to move forward and consequently constrict the bands about the drums. To release the brakes the throttle valve is rotated to a release position or to vent that portion of the conduit between the brake cylinders and throttle valve through the by-pass thereof. The coiled springs 32 will then release the brakes and return the pistons to the rear end of the cylinders for a subsequent operation. A gage 41 may be connected to the conduit 34 to show the amount of air pressure applied to the brakes, and, another gage 42 connected to the reservoir to show the pressure therein.

I have illustrated a manually operable means, to apply the brakes in which the levers 26 are connected by means of links to bell cranks 43 mounted on the frame, said bell cranks being in turn connected by means of links to a central lever 44 having an arm 45 which is formed with a pin 46. Said pin enters the slotted end of a link 47 running forward to a lever or foot pedal 48. The slotted connection 46 permits the brake to be air operated without disturbing the manual arrangement.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:

1. In combination with a motor vehicle chassis having side bars U-shaped in cross section, an air brake system including air compressors on the front and rear axles of the vehicle equipped with conduits which are carried within the U-shaped sides of said chassis and discharge in a common tank, intermediate said axles, braking mechanism in communication with said tank and operable by influence of the latter's contents and manual means for independently operating said mechanism.

2. In combination with a rear axle housing a brake drum, a support on the housing, a band encircling the drum, a lever fulcrumed on the support having the ends of the band connected thereto at opposite sides of the fulcrum, a cylinder mounted on the support, a piston, a piston rod, a sliding connection between the rod and lever, a reservoir, a connection between the reservoir and cylinder, and a valve in said connection.

In testimony whereof I affix my signature in presence of two witnesses.

McKEE COOPER. [L. S.]

Witnesses:
JOHN B. ANDERSON,
W. P. BROWN.